(12) United States Patent
Okamoto

(10) Patent No.: US 6,734,899 B1
(45) Date of Patent: May 11, 2004

(54) METHOD OF ESTABLISHING COLOR CORRECTION FUNCTIONS

(75) Inventor: Takahiro Okamoto, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/133,432

(22) Filed: Aug. 13, 1998

(30) Foreign Application Priority Data

Aug. 25, 1997 (JP) ............................................ 9-228156

(51) Int. Cl.[7] .......................... H04N 17/00; H04N 17/02
(52) U.S. Cl. ..................................... 348/188; 348/223.1
(58) Field of Search ................................ 348/254, 175, 348/187, 188, 223.1, 228, 649, 655, 671

(56) References Cited

U.S. PATENT DOCUMENTS

| | | | | |
|---|---|---|---|---|
| 4,575,124 A | * | 3/1986 | Morrison ..................... | 283/115 |
| 5,202,935 A | * | 4/1993 | Kanamori et al. ........... | 358/500 |
| 5,379,130 A | * | 1/1995 | Wang et al. ................. | 358/3.15 |
| 5,668,596 A | * | 9/1997 | Vogel ........................... | 348/222 |
| 5,768,403 A | * | 6/1998 | Suzuki et al. ................ | 358/529 |
| 5,917,987 A | * | 6/1999 | Neyman ....................... | 348/188 |
| 5,926,562 A | * | 7/1999 | Hyodo et al. ................ | 348/223 |
| 6,034,711 A | * | 3/2000 | Trask et al. .................. | 347/240 |

* cited by examiner

Primary Examiner—Wendy R. Garber
Assistant Examiner—Matthew L Rosendale
(74) Attorney, Agent, or Firm—Sughrue Mion, PLLC

(57) ABSTRACT

The gray balance of an input signal produced when a gray chart is read by a digital camera is adjusted by a color processor. Thereafter, a color chart is read by the digital camera, and color correction functions in the color processor are corrected so that chromaticities of an output signal with the adjusted gray balance will be in conformity with the chromaticities of the color chart.

9 Claims, 5 Drawing Sheets

METHOD OF ESTABLISHING COLOR CORRECTION FUNCTIONS

BACKGROUND OF THE INVENTION

1. Field of the Invention

The present invention relates to a method of establishing color correction functions for making a color correction depending on an image output device from hues of an input signal supplied from an image input device.

2. Description of the Related Art

In DTP (desktop printing), printing, and platemaking industries, there has widely been used a color image input and output system for obtaining an input signal by reading a color subject with a scanner, effecting desired image processing on the input signal, and outputting a color image based on the processed signal from an image output device such as a color printer, a CRT (cathode-ray tube), or the like.

For the purpose of making clear, and removing impurities from, colors of a reproduced color image, the color image input and output system determines, with a color correcting circuit, and hues of an input signal which has been produced by scanning a color subject, and corrects colors using color correction functions established with respect to the respective hues. Colors can be made clear by increasing the number of necessary colors, and color impurities can be removed by removing unnecessary colors.

The color correction functions are capable of correcting colors with a relatively simple function configuration when processing an input signal produced by reading a reversal subject with a scanner. However, the color correction functions are unable to correct colors with sufficient accuracy when processing an input signal generated from an image input device of different characteristics such as a digital camera.

SUMMARY OF THE INVENTION

It is an object of the present invention to provide a method of establishing color correction functions that are optimum for an input signal.

Another object of the present invention is to provide a method of establishing color correction functions that are optimum for characteristics of image input devices.

Still another object of the present invention is to provide a method of establishing color correction functions that optimum for characteristics of digital cameras.

The above and other objects, features, and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
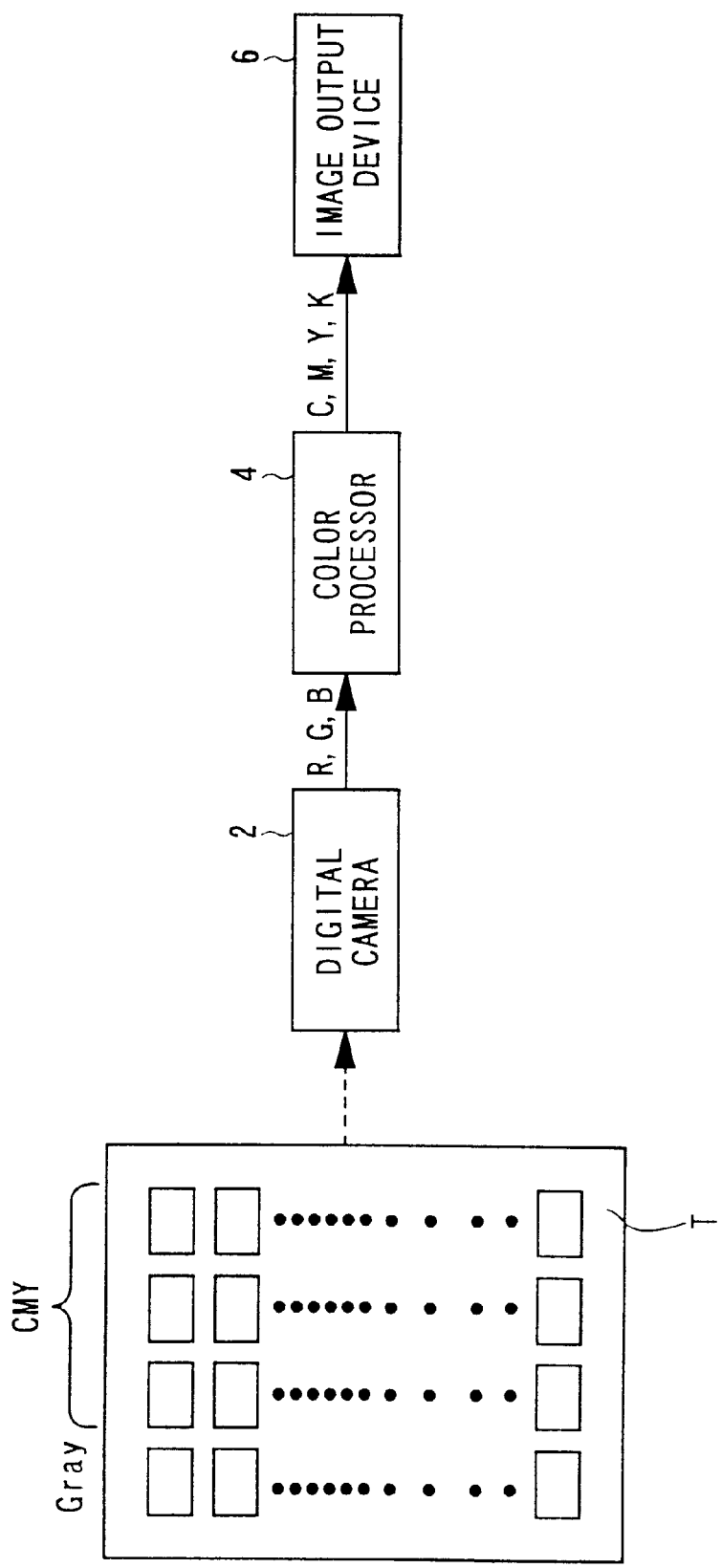
FIG. 1 is a block diagram of a color image input and output system to which a method of establishing color correction functions according to the present invention is applied.

As shown in FIG. 1, a color image input and output system to which a method of establishing color correction functions according to the present invention is applied comprises a digital camera 2 as an image input device, a color processor 4 for effecting color processing, including color correction, on an input signal RGB of colors R, G, B supplied from the digital camera 2, and an image output device 6 for outputting a desired color image based on a color-processed output signal CMYK of colors C, M, Y, K from the color processor 4.

Figure 2:
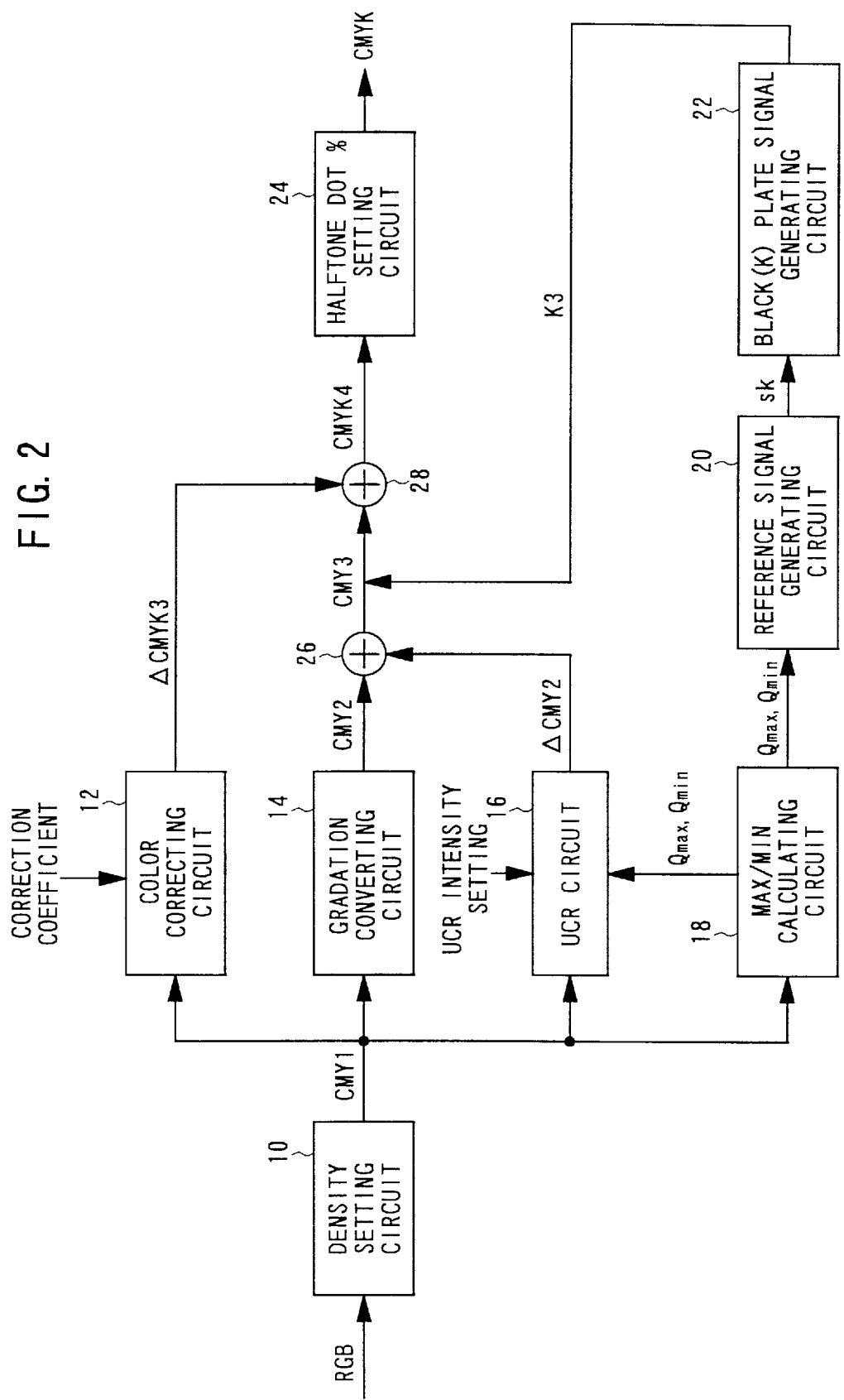
FIG. 2 is a block diagram of an image processing circuit in a color processor of the color image input and output system shown in FIG. 1.

FIG. 2 shows in block form an image processing circuit in the color processor 4. The image processing circuit serves to generate the output signal CMYK for use in the image output device 6 from the input signal RGB supplied from the digital camera 2.

The image processing circuit has a density setting circuit 10 for adjusting the density values of highlights (HL) and shadows (SH) of the input signal RGB depending on designated values and generating a three-color signal CMY1 of colors C, M, Y. The density setting circuit 10 supplies the generated three-color signal CMY1 to a color correcting circuit 12, a gradation converting circuit 14, an UCR (Under Color Removal) circuit 16, and a maximum and minimum calculating circuit 18.

The color correcting circuit 12, which will be described in detail later on with reference to FIG. 3, adjusts the three-color signal CMY1 according to correction coefficients which represent desired calibration values thereby to generate a four-color corrected signal ΔCMYK3 of colors C, M, Y, K. The gradation converting circuit 14 converts gradations of the three-color signal CMY1 using tone curves of the respective three colors to generate a converted three-color signal CMY2. The UCR circuit 16 generates a three-color corrected signal ΔCMY2, which represents the three-color signal CMY1 corrected with respect to a gray component, from the three-color signal CMY1 and maximum and minimum values Qmax, Qmin of the three-color signal CMY1. The maximum and minimum calculating circuit 18 determines the maximum and minimum values Qmax, Qmin of the three-color signal CMY1.

The image processing circuit also includes a reference signal generating circuit 20, a black (K) plate signal generating circuit 22, and a halftone dot % setting circuit 24.

The reference signal generating circuit 20 generates a reference signal sk for adjusting the level of a black (K) plate signal K3 according to the maximum and minimum values Qmax, Qmin. The black (K) plate signal generating circuit 22 generates a black (K) plate signal K3 based on the reference signal sk according to a predetermined conversion table. The halftone dot % setting circuit 24 generates the color-processed output signal CMYK as a halftone dot % signal, which represents the halftone dot % values of highlights (HL) and shadows (SH) adjusted depending on the output characteristics of the image output device 6, from a four-color signal CMYK4.

Between the gradation converting circuit 14 and the halftone dot % setting circuit 24, there are connected an adder 26 for adding the three-color corrected signal ΔCMY2 from the UCR circuit 16 to the three-color signal CMY2 from the gradation converting circuit 14 thereby to produce a three-color signal CMY3, and an adder 28 for adding the four-color corrected signal ΔCMYK3 to the three color signal CMY3 and the black (K) plate signal K3 thereby to produce the four-color signal CMYK4, which is supplied to the halftone dot % setting circuit 24.

Figure 3:
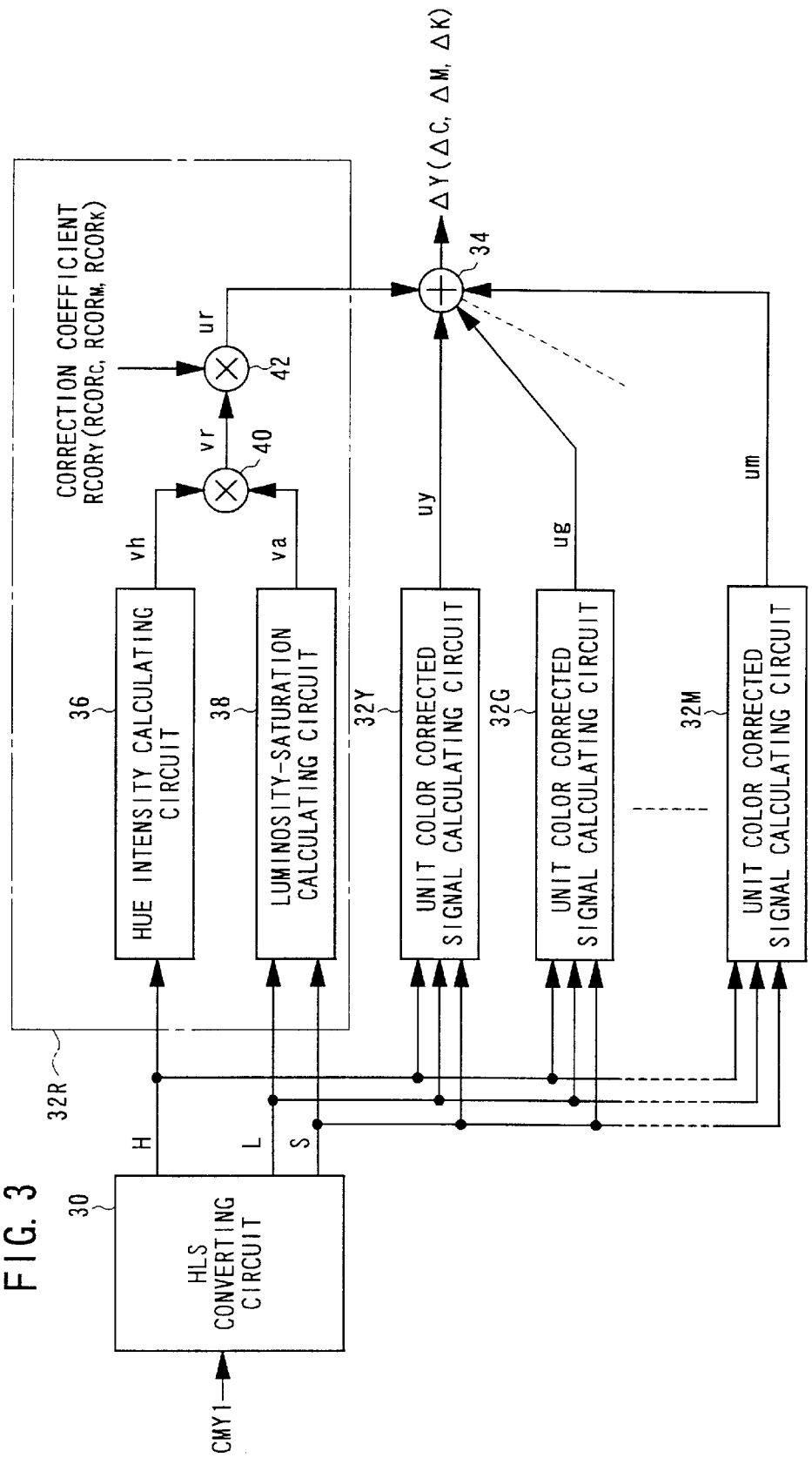
FIG. 3 is a block diagram of a color correcting circuit of the color processor shown in FIG. 2.

As shown in FIG. 3, the color correcting circuit 12 comprises an HLS converting circuit 30 for converting the three-color signal CMY1 to a hue signal H, a luminosity signal L, and a saturation signal S, a plurality of unit color corrected signal calculating circuits 32R, 32Y, 32G, ... 32M for calculating unit color corrected signals of hues R, Y, G, C, B, M from the hue signal H, the luminosity signal L, and the saturation signal S, and an adder 34 for adding the unit color corrected signals calculated by the unit color corrected signal calculating circuits 32R, 32Y, 32G, ... 32M thereby to generate corrected signals ΔC, ΔM, ΔY, ΔK of the four-color corrected signal ΔCMYK3. The unit color corrected signal calculating circuits 32R, 32Y, 32G, ... 32M and the adder 34 are provided for each of the corrected signals ΔC, ΔM, ΔY, ΔK of the colors C, M, Y, K. In FIG. 3, only the color correcting circuit 12 for generating the corrected signal ΔY is illustrated.

The unit color corrected signal calculating circuit 32R comprises a hue intensity calculating circuit 36 for determining a hue intensity signal vh that is a correction intensity signal from the hue signal H according to a hue intensity function that is a color correction function established for the color R, a luminosity-saturation calculating circuit 38 for determining a luminosity-saturation intensity signal va from the luminosity signal L and the saturation signal S according to a luminosity-saturation intensity function established for the color R, a multiplier 40 for multiplying the hue intensity signal vh by the luminosity-saturation intensity signal va, and a multiplier 42 for multiplying the product from the multiplier 40 by a correction coefficient $RCOR_Y$ which is a calibration value for the color R supplied from an external source. The other unit color corrected signal calculating circuits 32Y, 32G, ... 32M have respective hue intensity functions and respective luminosity-saturation intensity functions established for the colors Y, G, ... M, and have structural details identical to those of the unit color corrected signal calculating circuit 32R.

The method of establishing color correction functions according to the present invention, using the color image input and output system shown in FIGS. 1 through 3, will be described below in detail.

As shown in FIG. 1, a test chart T is prepared which comprises a gray chart Gray composed of a plurality of gray patches having stepwise luminosity levels, and a color chart CMY composed of a plurality of patches having stepwise hue, luminosity, and saturation levels, the color chart CMY having known chromaticity values.

Prior to reading a subject image, there are established in advance hue intensity functions FR(H), FY(H), FG(H), ... FM(H) which are color correction functions for producing a hue intensity signal vh as a correction intensity signal from the hue signal H, and luminosity-saturation intensity functions GR(L,S), GY(L,S), GG(L,S), ... GM(L,S) which are color correction intensity functions for producing a luminosity-saturation intensity signal va as a correction intensity signal from the luminosity signal L and the saturation signal S. The letters R, Y, G, ... M in the reference characters assigned to these functions indicate colors to be corrected.

Halftone dot % values of the color chart CMY are determined, and the color chart CMY is read by the digital camera 2 to generate a signal which is not corrected by the color correcting circuit 12, after which halftone dot % values of the generated signal are determined. Differences between these halftone dot % values are determined respectively for the hues R, Y, G, ... M, and used as corrective quantities for the luminosity and saturation at each of the hues. Then, a cubic curved surface is determined from the differences according to the method of least squares, and the determined cubic curved surface is normalized by a maximum value with a minimum value set to "0". The cubic curved surface is established as the luminosity-saturation intensity functions GR(L,S), GY(L,S), GG(L,S), ... GM(L,S).

Figure 6:
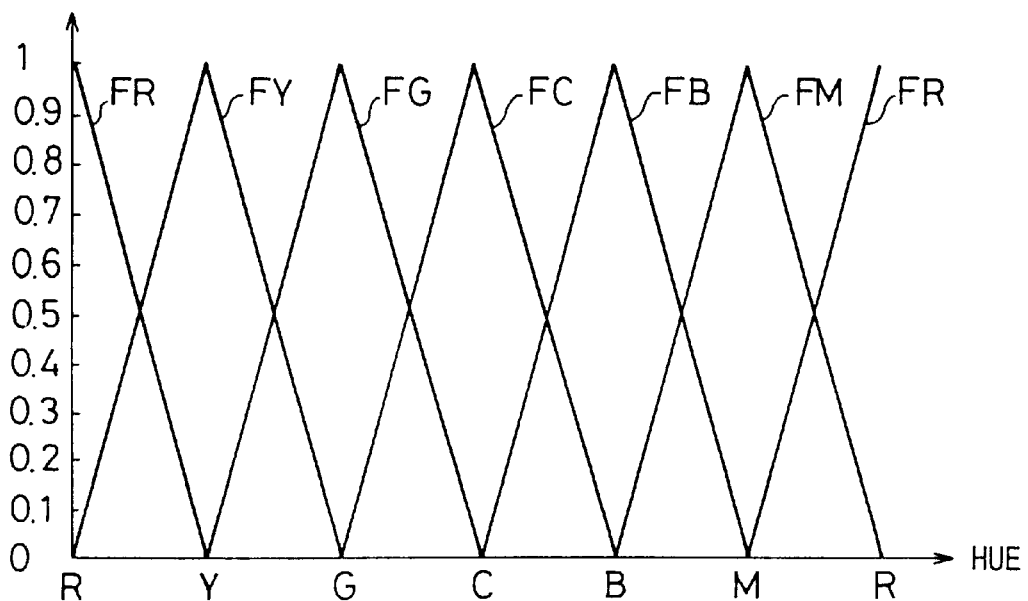
FIG. 6 is a diagram illustrative of hue intensity functions before they are corrected.

The hue intensity functions FR(H), FY(H), FG(H), ... FM(H) are tentatively established as functions each having a peak at the hue to be corrected and linearly decreasing toward adjacent hues, as shown in FIG. 6.

Figure 4:
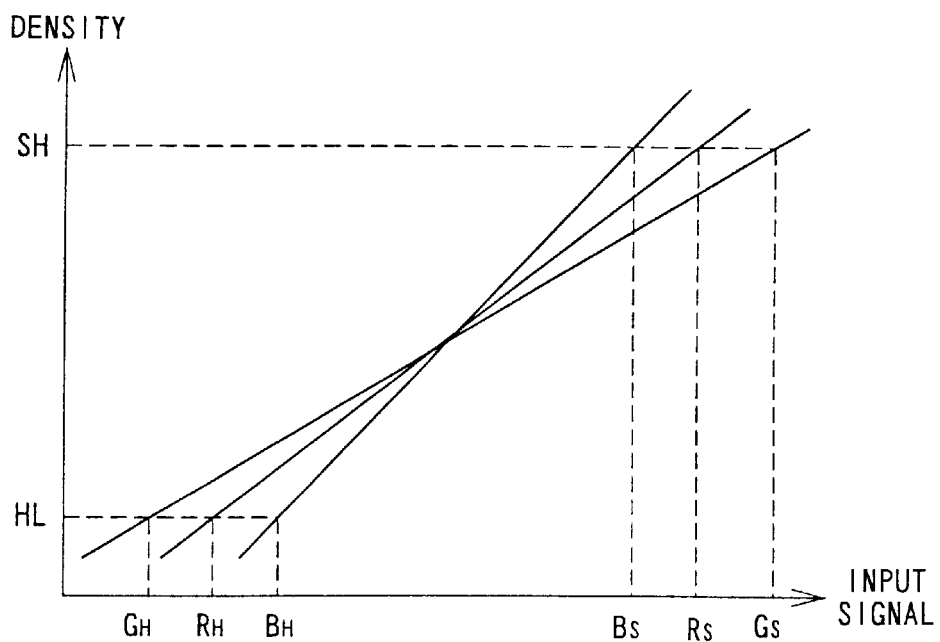
FIG. 4 is a diagram illustrative of a process of adjusting highlights and shadows of a gray balance.

The gray chart Gray of the test chart T is read by the digital camera 2. An input signal RGB produced by the digital camera 2 when patches of a highlight (HL) and a shadow (SH) of the gray chart Gray are read is referred to as signals RH, GH, BH and signals RS, GS, BS. The density setting circuit 10 is adjusted such that these signals RH, GH, BH, RS, GS, BS are equal to each other (RH=GH=BH, RS=GS=BS) (see FIG. 4).

Figure 5:
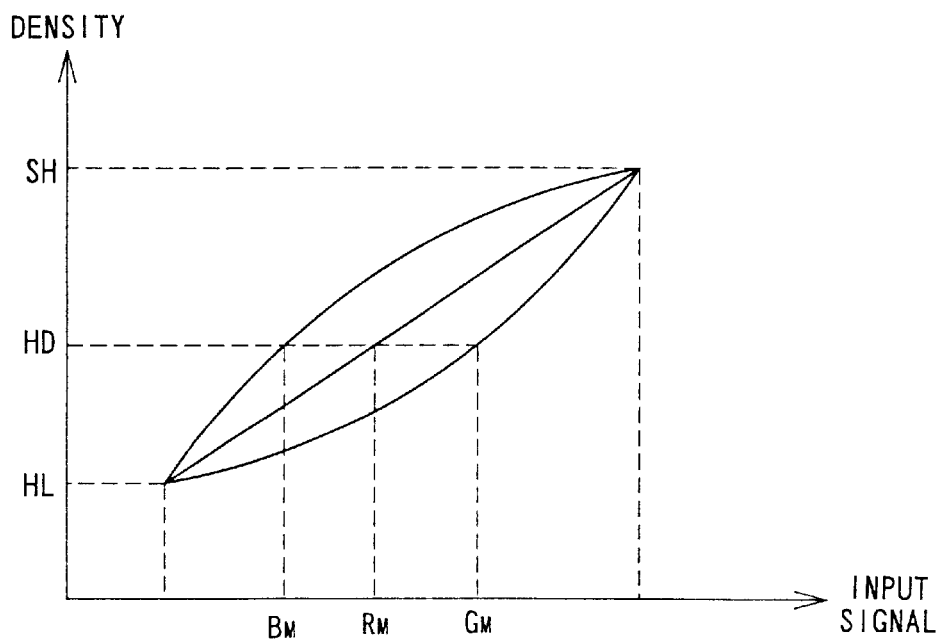
FIG. 5 is a diagram illustrative of a process of adjusting medium tones of a gray balance.

Then, a patch of a medium tone (MD) of the gray chart Gray is read by the digital camera 2, and an input signal RGB produced by the digital camera 2 is referred to as signals RM, GM, BM. The gradation converting circuit 14 is adjusted such that these signals RM, GM, BM are equal to each other (RM=BM=BM) (see FIG. 5).

The color processor 4 with the gray balance thus adjusted is supplied with the input signal RGB which is generated by the digital camera 2 when it reads the gray chart Gray. The color processor 4 effects color processing on the supplied input signal RGB according to the established functions to produce an output signal CMYK. When the output signal CMYK is supplied to the image output device 6, the image output device 6 can reproduce the gray chart Gray highly accurately.

Then, the color chart CMY of the test chart T is read by the digital camera 2. An input signal RGB generated by the digital camera 2 at this time is converted to a three-color signal CMY1 whose highlight and shadow density values have been adjusted to predetermined densities by the density setting circuit 10. The three-color signal CMY1 is supplied from the density setting circuit 10 to the color correcting circuit 12, the gradation converting circuit 14, the UCR circuit 16, and the maximum and minimum calculating circuit 18.

The color correcting circuit 12 generates a four-color corrected signal ΔCMYK3 for the colors C, M, Y, K from the three-color signal CMY1 as follows:

The three-color signal CMY1 is converted to a hue signal H, a luminosity signal L, and a saturation signal S by the HLS converting circuit 30. The hue signal H is set to a range of $0.0 \leq H < 6.0$. The luminosity signal L is set to a range of $0.0 \leq L \leq 1.0$. The saturation signal S is set to a range of $0.0 \leq S \leq 1.0$. The hue signal H=0 represents a hue R, the hue signal H=1 a hue of Y, the hue signal H=2 a hue of G, the hue signal H=3 a hue of C, the hue signal H=4 a hue of B, and the hue signal H=5 a hue of M. The luminosity signal L=0 represents a dark color, and the luminosity signal L=1 represents a bright color. The saturation signal S=0 represents an impure color, and the saturation signal S=1 represents a clear color. The HLS converting circuit 30 determines a maximum value Qmax, a middle value Qmid, and a minimum value Qmin of the three-color signal CMY1. If a color which gives the maximum value Qmax is indicated by Pmax, a color which gives the middle value Qmid by Pmid, and a color which gives the minimum value Qmin is indicated by Pmin, then the hue signal H is calculated as:

H=1.0−V when Pmax=Y and Pmin=C,
H=1.0+V when Pmax=Y and Pmin=M,
H=3.0−V when Pmax=C and Pmin=M,
H=3.0+V when Pmax=C and Pmin=Y,
H=5.0−V when Pmax=M and Pmin=Y, and
H=5.0+V when Pmax=M and Pmin=C, where V=(Qmid−Qmin)/(Qmax−Qmin).

The luminosity signal L is calculated as:

L=1.0−Qmax.

The saturation signal S is calculated as:

S=0.0 if Qmax≦−0.0, and
S=1.0−(Qmin+0.1)/(Qmax+0.1) otherwise.

The hue signal H, the luminosity signal L, and the saturation signal S thus determined are supplied to the unit color corrected signal calculating circuits 32R, 32Y, 32G, . . . 32M, which then generate an R corrected signal vr, a Y corrected signal vy, a G corrected signal vg, . . . an M corrected signal vm using the hue intensity functions FR(H), FY(H), FG(H), . . . FM(H) and the luminosity-saturation intensity functions GR(L,S), GY(L,S), GG(L,S), . . . GM(L, S).

Specifically, the hue intensity calculating circuit 36 of the unit color corrected signal calculating circuit 32R calculates a hue intensity signal vh from the hue signal H according to the equation:

$$vh=FR(H),$$

and the luminosity-saturation calculating circuit 38 of the unit color corrected signal calculating circuit 32R calculates a luminosity-saturation intensity signal va from the luminosity signal L and the saturation signal S according to the equation:

$$va=GR(L,S).$$

The multiplier 40 multiplies the hue intensity signal vh by the luminosity-saturation intensity signal va thereby to produce the R corrected signal vr as the product according to the equation:

$$vr=vh.va.$$

If a corrected signal ΔY of the four-color corrected signal ΔCMYK3 is to be determined, then the multiplier 42 multiplies the R corrected signal vr thus determined by the correction coefficient $RCOR_Y$ for the color R with respect to the color Y thereby to determine a unit color corrected signal ur as the product according to the equation:

$$ur=vr.RCOR_Y.$$

Similarly, in the unit color corrected signal calculating circuits 32Y, 32G, . . . 32M, the respective multipliers 42 multiply corrected signals by respective correction coefficient for the colors Y, G, . . . M with respect to the colors Y thereby to determine respective unit color corrected signals uy, ug, . . . um.

The adder 34 then adds the unit color corrected signals ur, uy, ug, . . . um from the respective unit color corrected signal calculating circuits 32R, 32Y, 32G, . . . 32M into the corrected signal ΔY for the color Y according to the equation:

$$\Delta Y=ur+uy+ug+\ldots+um.$$

Color corrected signals ΔC, ΔM, ΔK for the colors C, M, K can likewise be determined using respective correction coefficients (correction coefficients $RCOR_C$, $RCOR_M$, $RCOR_K$ for the hue R).

The gradation converting circuit 14 converts gradations of the three-color signal CMY1 using tone curves of the respective three colors to generate a converted three-color signal CMY2, and supplies the generated converted three-color signal CMY2 to the adder 26.

The maximum and minimum calculating circuit 18 compares values of the three-color signal CMY1 to determine maximum and minimum values Qmax, Qmin, and supplies the maximum and minimum values Qmax, Qmin to the UCR circuit 16 and the reference signal generating circuit 20.

The UCR circuit 16 determines a UCR corrected value of the three-color signal CMY1 based on the maximum and minimum values Qmax, Qmin supplied from the maximum and minimum calculating circuit 18 and a desired UCR intensity setting, and supplies the determined UCR corrected value as a three-color corrected signal ΔCMY2 to the adder 26.

The adder 26 adds the three-color corrected signal ΔCMY2 to the three-color signal CMY2 supplied from the gradation converting circuit 14 thereby to generate a three-color signal CMY3 which has been corrected in terms of UCR, and supplies the three-color signal CMY3 to the adder 28.

The maximum and minimum values Qmax, Qmin supplied from the maximum and minimum calculating circuit 18 are supplied to the reference signal generating circuit 20, which generates a reference signal sk for generating a black (K) plate signal K3.

The reference signal sk may be generated as follows: Using the maximum value Qmax, the minimum value Qmin, and a predetermined control coefficient Gidx (0≦Gidx≦1) for controlling the width of gray, the reference signal sk is determined according to the equation:

sk=t·Qmin+(1−t).Qmax where t represents a parameter which is defined as:

t=1 (when Qmax≧(Gidx+1).Qmin or Qmin=0),
t=0 (when Qmax=Qmin), and
t=(Qmax−Qmin)/(Gidx.Qmin)
    (when Qmin<Qmax<(Gidx+1).Qmin).

The parameter t=1 indicates that the difference between the maximum value Qmax and the minimum value Qmin is large, and the colors of the three-color signal CMY1 is in a clear color range. The parameter t=0 indicates that the maximum value Qmax and the minimum value Qmin are equal to each other, and the colors of the three-color signal CMY1 are gray. The parameter t in the range of 0<t<1 indicates that the maximum value Qmax and the minimum value Qmin are small, and the colors of the three-color signal CMY1 is in an impure color range. Therefore, when the colors of the three-color signal CMY1 is in a clear color range, the reference signal sk is equal to the minimum value Qmin with the parameter t=1. When the colors of the three-color signal CMY1 are gray, the reference signal sk is the same as the three-color signal CMY1 with the parameter t=0 (Qmax=Qmin). When the colors of the three-color signal CMY1 is in an impure color range, the reference signal sk is of a value determined by the maximum value Qmax or the minimum value Qmin.

The reference signal sk thus determined is supplied as a signal for adjusting the level of a black (K) plate signal K3 to the black (K) plate signal generating circuit 22. The black (K) plate signal generating circuit 22 generates a black (K) plate signal K3 based on the reference signal sk according to a predetermined conversion table. When the colors of the three-color signal CMY1 is in an impure color range, the black (K) plate signal K3 can be increased or reduced depending on the degree of color impurities according to the maximum value Qmax and the minimum value Qmin. The range of color impurities can be adjusted by the control coefficient Gidx.

The three-color signal CMY3 which has been corrected in terms of UCR and supplied from the adder 26 and the black (K) plate signal K3 supplied from the black (K) plate signal generating circuit 22 are added to the four-color corrected signal ΔCMYK3 of the colors C, M, Y, K from the color correcting circuit 12 by the adder 28, thus generating a color corrected four-color signal CMYK4. The four-color signal CMYK4 is then converted by the halftone dot % setting circuit 24 to an output signal CMYK as a halftone dot % signal whose highlight (HL) and shadow (SH) halftone dot % values have been adjusted depending on the output characteristics of the image output device 6. The image output device 6 then generates a color image representative of the color chart CMY based on the output signal CMYK.

The output signal CMYK is generated from the color chart CMY whose colorimetric values L*, a*, b* are known. Therefore, calorimetric values L*, a*, b* with respect to the output signal CMYK are determined, and the hue intensity functions FR(H), FY(H), FG(H), . . . FM(H) are corrected so that the determined calorimetric values L*, a*, b* will be in conformity with the known colorimetric values L*, a*, b* of the color chart CMY. In order to determine the hue intensity functions FR(H), FY(H), FG(H), . . . FM(H), the UCR process by the UCR circuit 16, the process of generating a black (K) plate signal with the black (K) plate signal generating circuit 22, and the process of generating a corrected signal ΔK of the color K with the color correcting circuit 12 may not be carried out, but only the color chart CMY may be generated, and colorimetric values L*, a*, b* determined by reading the color chart CMY may be equalized to the known calorimetric values L*, a*, b* of the color chart CMY.

Figure 7:
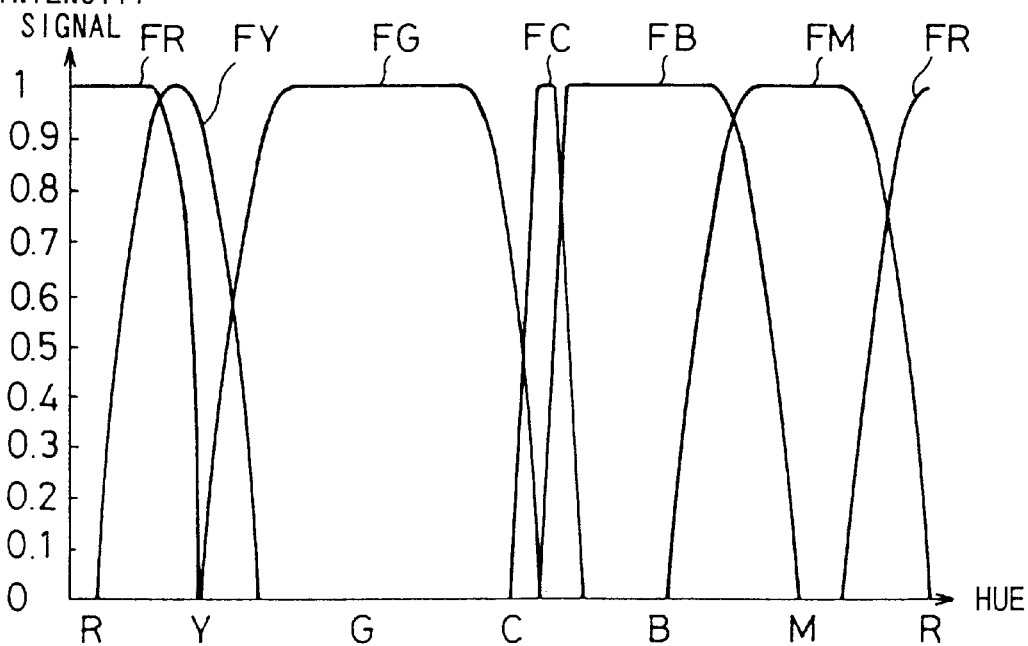
FIG. 7 is a diagram illustrative of hue intensity functions after they are corrected.

FIG. 7 shows the hue intensity functions FR(H), FY(H), FG(H), . . . FM(H) thus corrected. Using the hue intensity functions FR(H), FY(H), FG(H), . . . FM(H) thus established, the image output device 6 can reproduce a color image of desired colors highly accurately based on an output signal CMYK which is converted by the color processor 4 from an input signal RGB supplied from the digital camera 2. The hue intensity functions FR(H), FY(H), FG(H), . . . FM(H) may similarly be established with respect to all image input devices including the digital camera 2.

Although a certain preferred embodiment of the present invention has been shown and described in detail, it should be understood that various changes and modifications may be made therein without departing from the scope of the appended claims.

What is claimed is:

1. A method of establishing color correction functions for correcting colors depending on an image output device from hues of an input signal supplied from an image input device, the method comprising the steps of:

adjusting a gray balance to cause the image output device to output a gray color by correcting an input signal produced when a gray chart is read by the image input device;

determining chromaticities of an output signal whose gray balance is adjusted with respect to an input signal which is produced when a color chart having known chromaticities is read by the image input device; and establishing color correction functions to correct said output signal in order to equalize the chromaticities of the output signal to the corresponding known chromaticities of said color chart.

2. A method according to claim 1, wherein said step of adjusting the gray balance comprises the steps of:

adjusting gray balances of input signals of highlights and shadows; and adjusting gray balances of input signals of medium tones.

3. A method according to claim 1, wherein said color correction functions comprise color correction functions with respect to hues.

4. A method according to claim 3, further comprising the step of:

prior to said step of establishing the color correction functions with respect to hues, adjusting color correction functions with respect to luminosities and saturations.

5. A method according to claim 1, wherein said hues are determined from maximum, minimum, and middle values of said input signal.

6. A method according to claim 1, wherein said gray chart comprises a plurality of patches having stepwise luminosity levels.

7. A method according to claim 1, wherein said color chart comprises a plurality of patches having stepwise hue, luminosity, and saturation levels.

8. A method according to claim 1, wherein said color chart has known colorimetric values.

9. A method according to claim 1, wherein said image input device comprises a digital camera.

* * * * *

UNITED STATES PATENT AND TRADEMARK OFFICE
CERTIFICATE OF CORRECTION

PATENT NO. : 6,734,899 B1
DATED : May 11, 2004
INVENTOR(S) : Takahiro Okamoto

It is certified that error appears in the above-identified patent and that said Letters Patent is hereby corrected as shown below:

Title page,
Item [54], Title, should read -- METHOD OF ESTABLISHING COLOR CORRECTION FUNCTIONS BY USING A GRAY SCALE AND COLOR CHART --.

Signed and Sealed this

Seventeenth Day of August, 2004

JON W. DUDAS
*Acting Director of the United States Patent and Trademark Office*